(12) United States Patent
Jeng et al.

(10) Patent No.: US 7,550,094 B2
(45) Date of Patent: Jun. 23, 2009

(54) LIQUID CRYSTAL DEVICE

(75) Inventors: Shie-Chang Jeng, Pingtung County (TW); Hsing-Lung Wang, Taoyuan County (TW); Chi-Chang Liao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 23 days.

(21) Appl. No.: 11/830,851

(22) Filed: Jul. 31, 2007

(65) Prior Publication Data

US 2008/0198301 A1    Aug. 21, 2008

(30) Foreign Application Priority Data

Feb. 16, 2007    (TW) .............................. 96106100 A

(51) Int. Cl.
*C09K 19/00*    (2006.01)
*C09K 19/06*    (2006.01)
*C09K 19/52*    (2006.01)

(52) U.S. Cl. .................... 252/299.01; 428/1.1; 428/1.2; 428/1.21; 428/1.23; 430/20; 349/33; 349/167; 349/168; 349/170; 349/171; 349/172

(58) Field of Classification Search ................... 349/33, 349/167–168, 170–172; 430/20; 428/1.1, 428/1.2, 1.21, 1.23; 252/299.01
See application file for complete search history.

(56) References Cited

U.S. PATENT DOCUMENTS

2005/0062927 A1* 3/2005 Nakamura et al. .......... 349/170
2006/0244873 A1* 11/2006 Nakamura et al. ............ 349/33
2007/0268446 A1* 11/2007 Jeng et al. ................... 349/166

* cited by examiner

*Primary Examiner*—Geraldina Visconti
(74) *Attorney, Agent, or Firm*—Jianq Chyun IP Office

(57) ABSTRACT

A liquid crystal device including a first electrode substrate, a second electrode substrate and a liquid crystal layer is provided. The liquid crystal layer is disposed between the first electrode substrate and the second electrode substrate. The liquid crystal layer comprises liquid crystal molecules and particles. The liquid crystal molecules are vertically aligned when the applied voltage between the first electrode substrate and the second electrode substrate is less than a threshold voltage. The arrangement of the liquid crystal molecules is changed so as to produce optical changes in the liquid crystal device when the applied voltage between the first electrode substrate and the second electrode substrate is not less than the threshold voltage.

19 Claims, 5 Drawing Sheets

V < Vth     V ≥ Vth

LIQUID CRYSTAL DEVICE

CROSS-REFERENCE TO RELATED APPLICATION

This application claims the priority benefit of Taiwan application serial no. 96106100, filed Feb. 16, 2007. All disclosure of the Taiwan application is incorporated herein by reference.

BACKGROUND OF THE INVENTION

1. Field of the Invention

The present invention generally relates to a liquid crystal device, in particular, to a liquid crystal device capable of reducing or preventing the use of an alignment layer.

2. Description of Related Art

FIG. 1 is a schematic cross-sectional view of a conventional vertically aligned liquid crystal device. As show in FIG. 1, a conventional vertically aligned liquid crystal device (VA-LCD) 100 includes a lower electrode substrate 110, an upper electrode substrate 120, a liquid crystal layer 130, a lower alignment layer 160, an upper alignment layer 150, a lower polarizer 140, and an upper polarizer 170. The liquid crystal layer 130 is disposed between the lower electrode substrate 110 and the upper electrode substrate 120. The lower alignment layer 160 is disposed between the lower electrode substrate 110 and the liquid crystal layer 130, and the upper alignment layer 150 is disposed between the upper electrode substrate 120 and the liquid crystal layer 130. In addition, the lower polarizer 140 is disposed beneath the lower electrode substrate 110 and the upper polarizer 170 is disposed above the upper electrode substrate 120. According to FIG. 1, the main function of the lower alignment layer 160 and the upper alignment layer 150 is to produce a vertical alignment of the liquid crystal molecules in the liquid crystal layer 130. When a voltage is applied between the lower electrode substrate 110 and the upper electrode substrate 120, the electric field can induce the liquid crystal molecules in the liquid crystal layer 130 to rotate and show a certain optical characteristic.

In the conventional vertically aligned liquid crystal device 100, the liquid crystal layer 130 relies on the lower alignment layer 160 and the upper alignment layer 150 to produce a vertical alignment of the liquid crystal molecules. Therefore, the fabrication of the lower alignment layer 160 and the upper alignment layer 150 is indispensable. However, the production cost of the vertically aligned liquid crystal device 100 can not be easily reduced due to the requirement of fabricating the lower alignment layer 160 and the upper alignment layer 150.

SUMMARY OF THE INVENTION

Accordingly, the present invention relates to a liquid crystal device having particles therein.

According to an embodiment of the present invention, a liquid crystal device including a first electrode substrate, a second electrode substrate and a liquid crystal layer is provided. The liquid crystal layer is disposed between the first electrode substrate and the second electrode substrate. The liquid crystal layer comprises liquid crystal molecules and particles. The liquid crystal molecules are vertically aligned when the applied voltage between the first electrode substrate and the second electrode substrate is less than a threshold voltage. The arrangement of the liquid crystal molecules in the liquid crystal device changes when the applied voltage between the first and the second electrode substrates is not less than the threshold voltage.

In the present invention, particles are used to replace the alignment layer or minimize the use of the alignment layer in the liquid crystal device. Therefore, the present invention not only can effectively reduce the production cost, but can also be applied to a flexible liquid crystal device. Due to the ability of vertical alignment from particles, the mixture of LC-particles can have many applications in LC device, such as a hybrid-alignment nematic (HAN) LC device, a no-bias voltage $\pi$ cell with fast response and bistable bend-splay LC device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
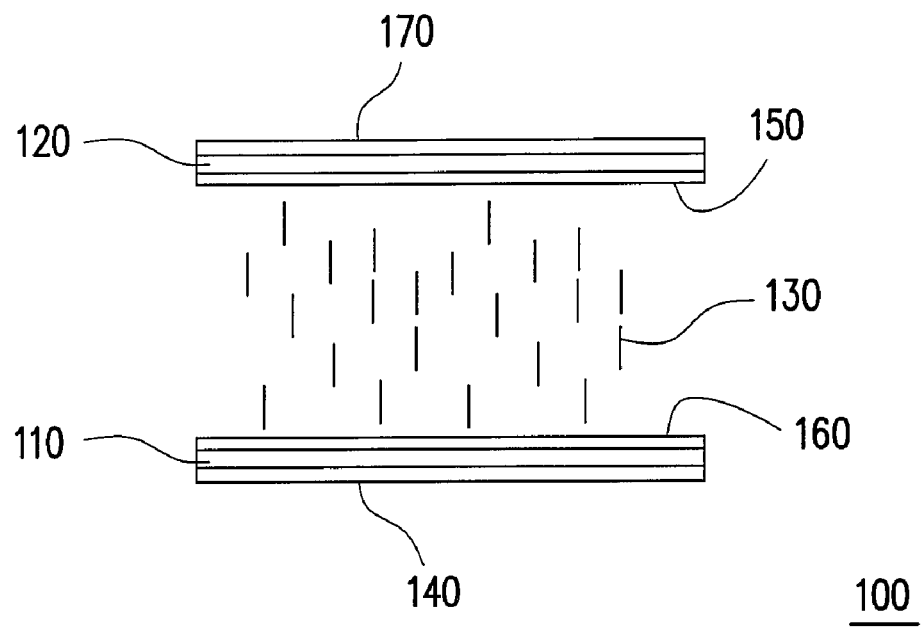
FIG. 1 is a schematic cross-sectional view of a conventional vertically aligned liquid crystal device.

Reference will now be made in detail to the present embodiments of the invention, examples of which are illustrated in the accompanying drawings. Wherever possible, the same reference numbers are used in the drawings and the description to refer to the same or like parts.

First Embodiment

Figure 2A:
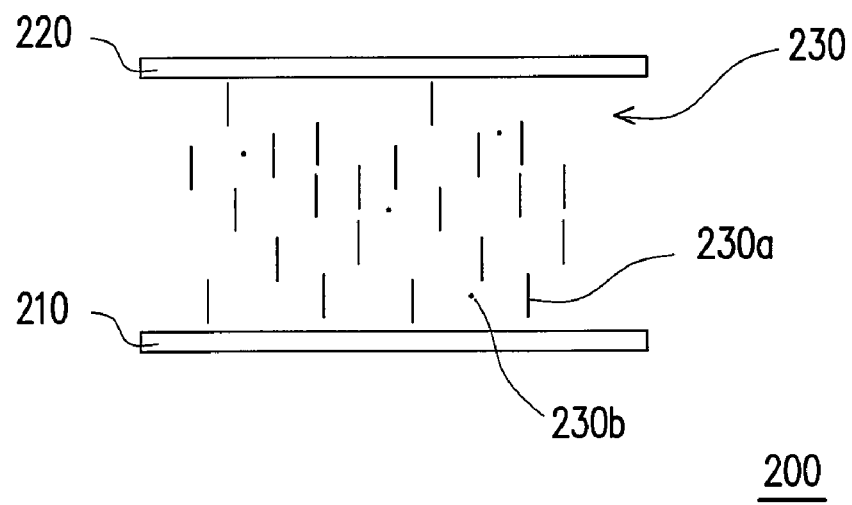
FIGS. 2A and 2B are schematic cross-sectional views of a liquid crystal device according to the first embodiment of the present invention.
Figure 2B:
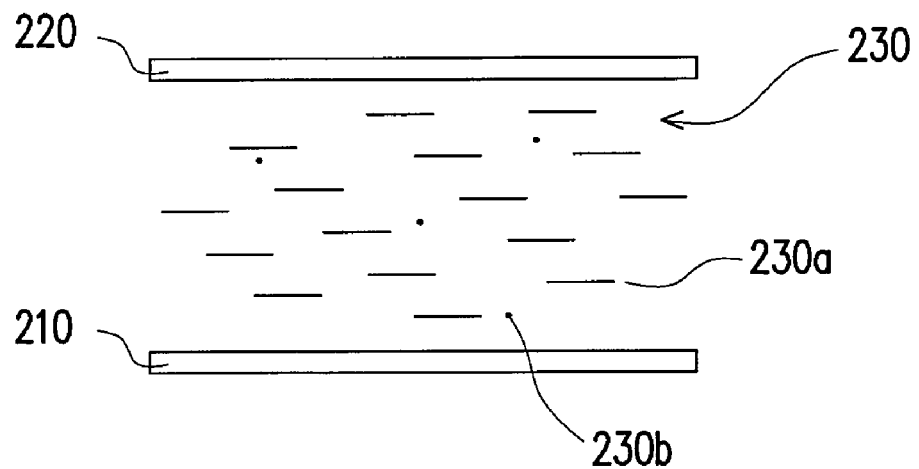

FIGS. 2A and 2B are schematic cross-sectional views of a liquid crystal device according to the first embodiment of the present invention. As shown in FIGS. 2A and 2B, the liquid crystal device 200 in the present embodiment includes a first electrode substrate 210, a second electrode substrate 220 and a liquid crystal layer 230. The liquid crystal layer 230 is disposed between the first electrode substrate 210 and the second electrode substrate 220. The liquid crystal layer 230 comprises liquid crystal molecules 230a and particles 230b. The liquid crystal molecules 230a in the liquid crystal layer 230 are vertically aligned (as shown in FIG. 2A) when the applied voltage between the first electrode substrate 210 and the second electrode substrate 220 is less than a threshold voltage. The arrangement of the liquid crystal molecules 230a in the liquid crystal layer 230 is changed (as shown in FIG. 2B) when the applied voltage between the first electrode substrate 210 and the second electrode substrate 220 is not less than the threshold voltage.

As shown in FIG. 2A, the liquid crystal layer 230 can be regarded as a 'liquid crystal molecules-particles mixture'. In the present embodiment, simply adding particles 230b into the liquid crystal molecules 230a produces the 'liquid crystal molecules-particles mixture'. Obviously, in the present embodiment, the liquid crystal molecules 230a in the liquid crystal layer 230 can be vertically aligned even without the alignment layers.

In the present embodiment, the selection of the liquid crystal molecules 230a is based on their ability to display liquid crystallinity. There is no particular limitation on the kind of liquid crystal molecules 230a to be used in the present embodiment. In the present embodiment, the liquid crystal molecules 230a can be nematic liquid crystal molecules. It should be noted that the liquid crystal molecules 230a could be positive dielectric anisotropic nematic liquid crystal molecules or negative dielectric anisotropic nematic liquid crystal molecules. Preferably, the liquid crystal molecules 230a are negative dielectric anisotropic nematic liquid crystal molecules.

In the present embodiment, polyhedral oligomeric silsesquioxanes (POSS) particles or its derivative particles are mixed with the liquid crystal molecules 230a to form the liquid crystal layer 230. More specifically, the content of said particles 230b is phenethyl-polyhedral oligomeric silsesquioxanes (phenethyl-POSS) cage mixture or octamethyl-POSS in a 1% to 20% by weight relative to the total weight of the particles and liquid crystal material. The average diameter of the particles 230b should not exceed 0.2 µm and the lower limit of the average diameter of the particles 230b is 0.001 µm. Obviously, beside the POSS particles, the present embodiment also permits the use of other types of particles. These particles can be transparent or opaque particles such as conductive particles, organic particles, inorganic particles or similar substances. The organic particles can be made from styrenic or acrylic organic materials. In addition, the inorganic particles may be inorganic oxide. For example, silicon dioxide particles or metal oxide particles. Moreover, particles comprising glass, silica, titania, alumina or other inorganic beads can also be preferably used. The particles can also be fullerene, carbon nanotubes or their derivative particles. In addition, the aforementioned particles can be hydrophilic or hydrophobic.

The present embodiment also allows the addition of other additives to the aforementioned 'liquid crystal molecules-particles mixture' (liquid crystal layer 230), for example: optically active substance and dichroic dye. In addition, polymer can also be added to the 'liquid crystal molecules-particles mixture' to turn the liquid crystal device 200 into a polymer stabilized mode so as to increase the response speed of the liquid crystal device 200. More specifically, for example, to form polymer in the 'liquid crystal molecules-particles mixture', monomers are added to the 'liquid crystal molecules-particles mixture' and then irradiated with light of a specified wavelength. Through the photo-induced polymerisation, polymer is formed in the 'liquid crystal molecules-particles mixture'.

It should be noted that the liquid crystal device 200 in the present embodiment could operate in a transmissive mode, a reflective mode or a transflective mode.

Second Embodiment

Figure 3:
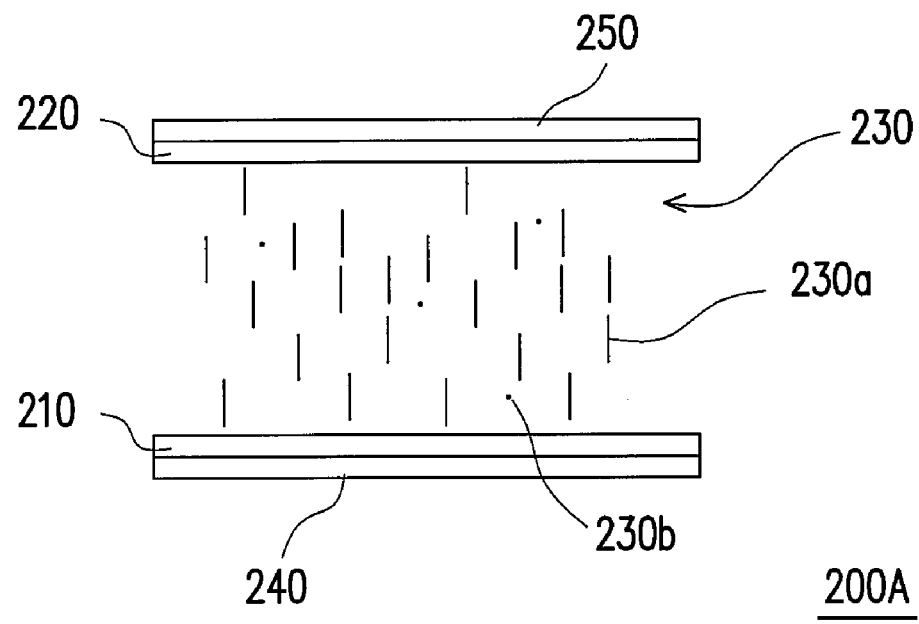
FIG. 3 is a schematic cross-sectional view of a liquid crystal device according to the second embodiment of the present invention.

FIG. 3 is a schematic cross-sectional view of a liquid crystal device according to the second embodiment of the present invention. As shown in FIG. 3, the liquid crystal device 200A in the present embodiment is similar to the liquid crystal device 200 in the first embodiment. The main difference is that the liquid crystal device 200A further includes a first polarizer 240 and a second polarizer 250. The first polarizer 240 is disposed beneath the first electrode substrate 210 and the second polarizer 250 is disposed above the second electrode substrate 220.

Figure 5:
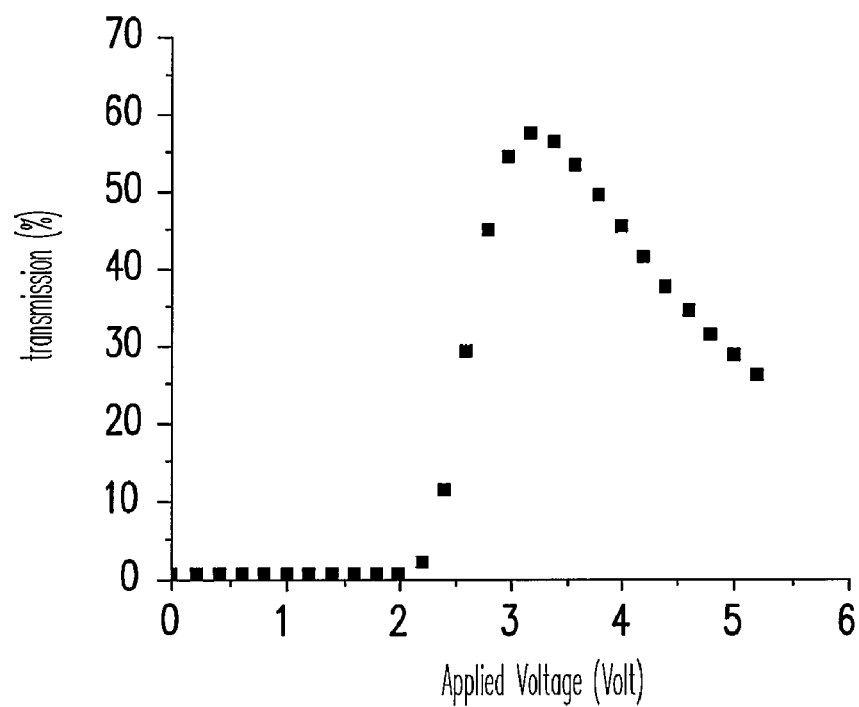
FIG. 5 is a graph showing the experimental data of transmission vs. applied voltage of the liquid crystal device in FIG. 3.

In the liquid crystal device 200A of the present embodiment, the polarizing axis of the first polarizer 240 is not in parallel with the polarizing axis of the second polarizer 250. In other words, the polarizing axis of the first polarizer 240 is orthogonal to the polarizing axis of the second polarizer 250, for example. When the applied voltage between the first electrode substrate 210 and the second electrode substrate 220 is less than a threshold voltage, the liquid crystal device 200A can display an ideal dark state without using the conventional alignment layer. When the applied voltage between the first electrode substrate 210 and the second electrode substrate 220 is not less than the threshold voltage, the arrangement of the liquid crystal molecules 230a in the liquid crystal layer 230 is changed, and the transmission of light through the liquid crystal device 200A can be controlled. The relation between the applied voltage and the transmission is shown in FIG. 5. In FIG. 5, however, the cell gap of the liquid device has not been optimal designed.

Figure 4:
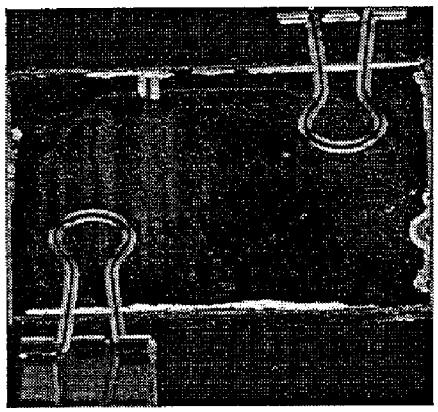
FIG. 4 shows the liquid crystal device in FIG. 3 in a dark state and in a bright state.
Figure 4:
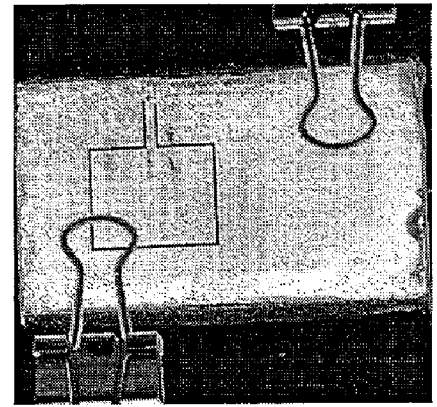

FIG. 4 shows the liquid crystal device in FIG. 3 in a dark state and in a bright state. When the applied voltage V between the first electrode substrate 210 and the second electrode substrate 220 is less than a threshold voltage $V_{th}$, the liquid crystal device 200A can display a dark state, and when the applied voltage V between the first electrode substrate 210 and the second electrode substrate 220 is not less than a threshold voltage $V_{th}$, the liquid crystal device 200A can display a bright state.

The liquid crystal device 200A in the foregoing embodiment can include a phase compensation film to improve the display quality. More specifically, the liquid crystal device 200A can include a first phase compensation film (not shown) disposed between the first polarizer 240 and the first electrode substrate 210 and a second phase compensation film (not shown) disposed between the second polarizer 250 and the second electrode substrate 220.

It should be noted that the present invention is not intended to limit the number of polarizers used in the liquid crystal device. In other words, the liquid crystal device 200A of the present embodiment may only have one polarizer disposed beneath the first electrode substrate 210 or disposed above the second electrode substrate 220.

Third Embodiment

Figure 6:
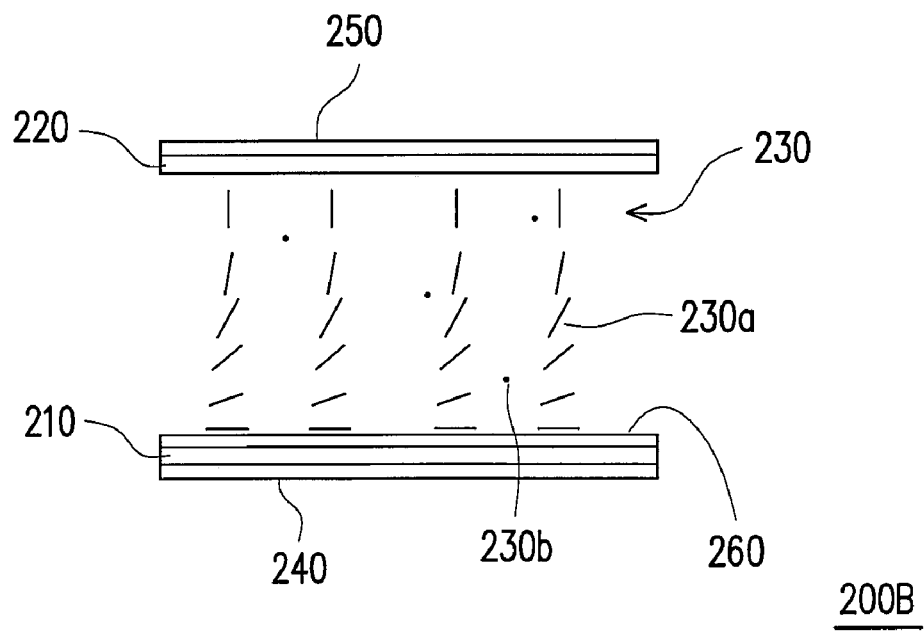
FIG. 6 is a schematic cross-sectional view of a liquid crystal device according to the third embodiment of the present invention.

FIG. 6 is a schematic cross-sectional view of a liquid crystal device according to the third embodiment of the present invention. As shown in FIG. 6, the liquid crystal device 200B in the present embodiment is similar to the liquid crystal device 200A in the second embodiment. The main difference is that the liquid crystal device 200B further includes an alignment layer 260 disposed between the first electrode substrate 210 and the liquid crystal layer 230.

In the liquid crystal device 200B of the present embodiment, the alignment layer 260 between the first electrode substrate 210 and the liquid crystal layer 230 is a homogeneous alignment layer. Due to the action of the homogeneous alignment layer 260 and the particles 230b on the liquid crystal molecules 320, an arrangement of mixed alignment is produced. In other words, under the action of the homogeneous alignment layer 260 and the particles 230b, the liquid crystal device 200B becomes a hybrid aligned nematic cell (HAN cell).

Because the liquid crystal device 200B of the present embodiment only requires the fabrication of a homogeneous alignment layer while skipping the fabrication of the vertical alignment layer on the other side, the fabrication cost can be reduced. Although the alignment layer 260 is disposed between the first electrode substrate 210 and the liquid crystal layer 230 as shown in FIG. 6, the present invention is not intended to limit the location of the alignment layer 260 close to the first electrode substrate 210. In other words, the alignment layer 260 can be disposed between the second electrode substrate 220 and the liquid crystal layer 230.

It should be noted that the polarizing axis of the first polarizer 240 and the polarizing axis of the second polarizer 250 in the liquid crystal device 200B are in parallel or orthogonally, for example. However, the liquid crystal device 200B of the present embodiment can work without the first polarizer 240 and the second polarizer 250.

Fourth Embodiment

Figure 7A:
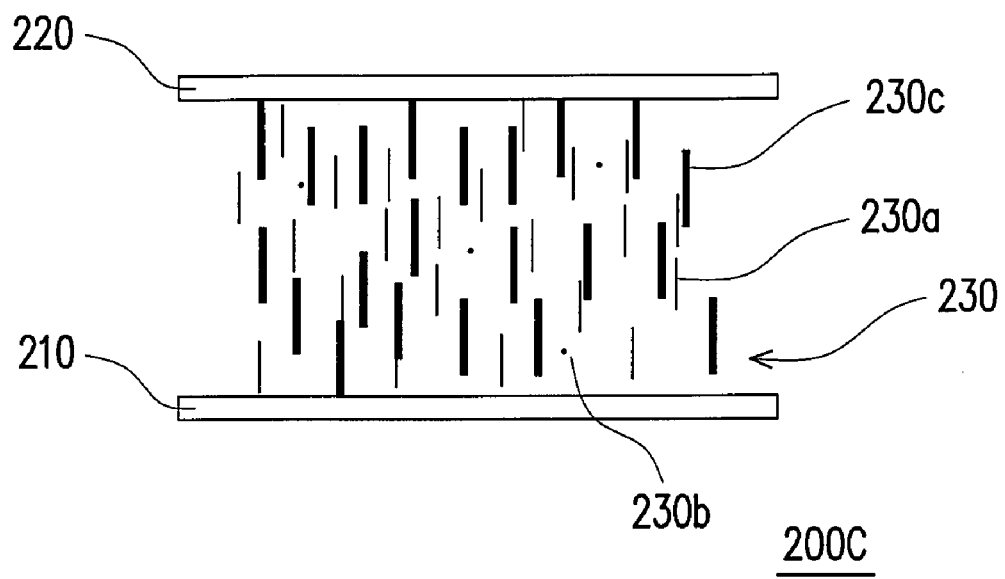
FIGS. 7A and 7B are schematic cross-sectional views of a liquid crystal device according to the fourth embodiment of the present invention.
Figure 7B:
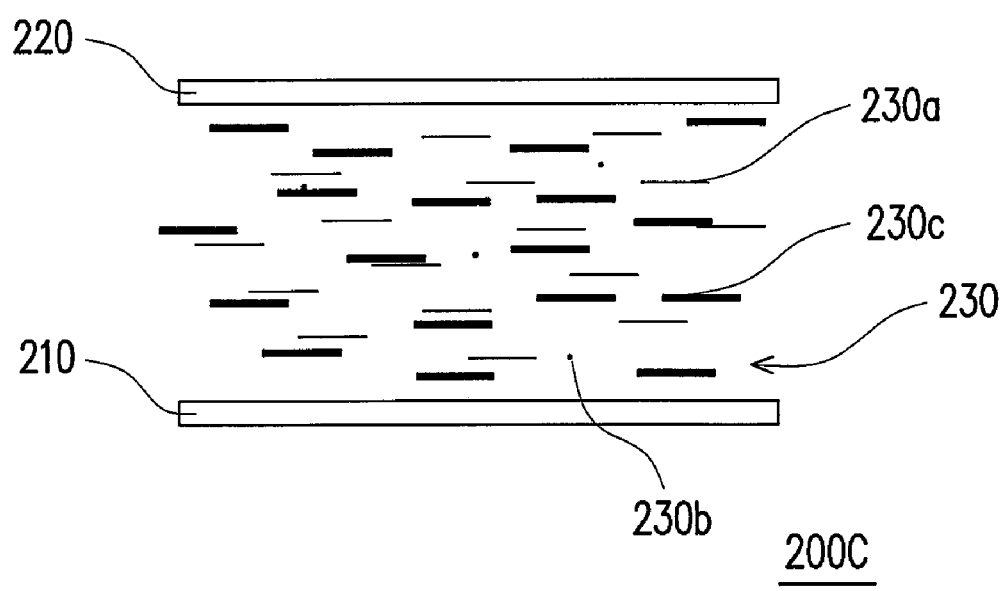

FIGS. 7A and 7B are schematic cross-sectional views of a liquid crystal device according to the fourth embodiment of the present invention. As shown in FIGS. 7A and 7B, the liquid crystal device 200C in the present embodiment is similar to the liquid crystal device 200 in the first embodiment. The main difference is that the liquid crystal layer 230 in the present embodiment further includes some dichroic dye. The dichroic dye 230c in the liquid crystal layer 230 can turn the liquid crystal device 200C into a guest-host liquid crystal device (GH-LCD) mode. The liquid crystal device 200C in the present embodiment can similarly achieve the vertical alignment without using an alignment layer. More specifically, when the applied voltage between the first electrode substrate 210 and the second electrode substrate 220 is less than a threshold voltage, the liquid crystal layer 230 is vertically aligned (as shown in FIG. 7A). At this time, the dichroic dye 230c will absorb very little light so that the liquid crystal device 200C displays a bright state. Conversely, when the applied voltage between the first electrode substrate 210 and the second electrode substrate 220 is not less than the threshold voltage, the arrangement of the liquid crystal layer 230 is changed (as shown in FIG. 7B). At this time, the dichroic dye 230c will absorb light so that the liquid crystal device 200C displays a dark state. In addition, the liquid crystal device 200C of the present embodiment can incorporate appropriate polarizers. The polarizers can be disposed outside the electrode substrates so as to improve the display quality such as the contrast ratio of the liquid crystal device 200C.

Beside the above mentioned embodiments, the mixture of LC-particles can combine with the horizontal alignment layers to from an effective high pretilt angle since the particles in LC show the ability of vertical alignment. Thus the mixture can be applied to a conventional pi-cell (π cell) and become a π cell with high pretilt angle in the range of 25°-75°. This feature of high pretilt angle can have many applications, such as a no-bias voltage π cell with fast response and bistable bend-splay LC device.

In the above embodiments, the selection of the liquid crystal molecules 230a is based on their ability to display liquid crystallinity. There is no particular limitation on the kind of liquid crystal molecules 230a to be used in the present embodiments. In the present embodiments, the liquid crystal molecules 230a can be nematic liquid crystal molecules. It should be noted that the liquid crystal molecules 230a could be positive dielectric anisotropic nematic liquid crystal molecules or negative dielectric anisotropic nematic liquid crystal molecules. Preferably, the liquid crystal molecules 230a are negative dielectric anisotropic nematic liquid crystal molecules.

In the embodiments, polyhedral oligomeric silsesquioxanes (POSS) particles or its derivative particles are mixed with the liquid crystal molecules 230a to form the liquid crystal layer 230. More specifically, the present embodiment uses particles in a 1% to 20% by weight relative to the total weight of the particles and liquid crystal material. The average diameter of the particles 230b should not exceed 0.2 μm and the lower limit of the average diameter of the particles 230b is 0.001 μm. Obviously, beside the POSS particles, the present embodiments also permit the use of other types of particles. These particles can be transparent or opaque particles such as conductive particles, organic particles, inorganic particles or similar substances. The organic particles can be made from styrenic or acrylic organic materials. In addition, the inorganic particles may be inorganic oxide. For example, silicon dioxide particles or metal oxide particles. Moreover, particles comprising glass, silica, titania, alumina or other inorganic beads can also be preferably used. The particles can also be fullerene, carbon nanotubes or their derivative particles. In addition, the aforementioned particles can be hydrophilic or hydrophobic.

The present embodiment also allows the addition of other additives to the aforementioned 'liquid crystal molecules-particles mixture' (liquid crystal layer 230), for example: optically active substance and dichroic dye. In addition, polymer can also be added to the 'liquid crystal molecules-particles mixture' to turn the liquid crystal device 200 into a polymer stabilized mode so as to increase the response speed of the liquid crystal device 200. More specifically, for example, to form polymer in the 'liquid crystal molecules-particles mixture', monomers are added to the 'liquid crystal molecules-particles mixture' and then irradiated with light of a specified wavelength. Through the photo-induced polymerisation, polymer is formed in the 'liquid crystal molecules-particles mixture'.

It should be noted that the liquid crystal device 200 in the present embodiment could operate in a transmissive mode, a reflective mode or a transflective mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal device, comprising:
   a first electrode substrate;
   a second electrode substrate; and
   a liquid crystal layer, disposed between the first electrode substrate and the second electrode substrate, wherein the liquid crystal layer comprises liquid crystal molecules and particles, the liquid crystal layer is vertically aligned when an applied voltage between the first electrode substrate and the second electrode substrate is less than a threshold voltage, and an arrangement of the liquid crystal layer is changed when the applied voltage between the first electrode substrate and the second electrode substrate is not less than the threshold voltage.

2. The liquid crystal device according to claim 1, wherein the particles have an average diameter between 0.001 μm to 0.2 μm.

3. The liquid crystal device according to claim 1, wherein the particles are composed of inorganic particles.

4. The liquid crystal device according to claim 1, wherein the particles are composed of organic particles.

5. The liquid crystal device according to claim 1, wherein the particles are composed of polyhedral oligomeric silsesquioxanes or its derivative particles.

6. The liquid crystal device according to claim 1, wherein the particles are composed of phenethyl-polyhedral oligomeric silsesquioxanes—cage mixture.

7. The liquid crystal device according to claim 1, wherein the particles are composed of octamethyl—polyhedral oligomeric silsesquioxanes.

8. The liquid crystal device according to claim 1, wherein the particles are composed of fullerene or its derivative particles.

9. The liquid crystal device according to claim 1, further comprising an alignment layer disposed between the first electrode substrate and the liquid crystal layer.

10. The liquid crystal device according to claim 1, further comprising an alignment layer disposed between the second electrode substrate and the liquid crystal layer.

11. The liquid crystal device according to claim 1, further comprising the first alignment layer disposed between the first electrode substrate and the liquid crystal layer, and the second alignment layer disposed between the second electrode substrate and the liquid crystal layer.

12. The liquid crystal device according to claim 1, further comprising a dichroic dye mixed with the liquid crystal layer.

13. The liquid crystal device according to claim 1, further comprising a polymer mixed with the liquid crystal layer.

14. The liquid crystal device according to claim 1, further comprising an optically active substance mixed with the liquid crystal layer.

15. The liquid crystal device according to claim 1, wherein the second electrode substrate is disposed above the first electrode substrate.

16. The liquid crystal device according to claim 1, further comprising a polarizer disposed beneath the first electrode substrate or above the second electrode substrate.

17. The liquid crystal device according to claim 1, further comprising:
 a first polarizer, disposed beneath the first electrode substrate; and
 a second polarizer, disposed above the second electrode substrate.

18. The liquid crystal device according to claim 16, further comprising:
 a first phase compensation film, disposed between the first polarizer and the first electrode substrate; and
 a second phase compensation film, disposed between the second polarizer and the second electrode substrate.

19. The liquid crystal device according to claim 1, wherein the liquid crystal molecules are negative dielectric anisotropic nematic liquid crystal molecules or positive dielectric anisotropic nematic liquid crystal molecules.

* * * * *